US006419376B1

(12) United States Patent
Friebolin

(10) Patent No.: US 6,419,376 B1
(45) Date of Patent: Jul. 16, 2002

(54) ILLUMINATED INDICATION DEVICE FOR ROAD TRAFFIC

(75) Inventor: Lothar Friebolin, Gaggenau (DE)

(73) Assignee: Dambach-Werke GmbH, Kuppenheim (DE)

( * ) Notice: Subject to any disclaimer, the term of this patent is extended or adjusted under 35 U.S.C. 154(b) by 0 days.

(21) Appl. No.: 09/701,690

(22) PCT Filed: Apr. 14, 1999

(86) PCT No.: PCT/EP99/02506

§ 371 (c)(1),
(2), (4) Date: Jan. 30, 2001

(87) PCT Pub. No.: WO99/63510

PCT Pub. Date: Dec. 9, 1999

(30) Foreign Application Priority Data

May 30, 1998 (DE) ........................................ 198 24 425

(51) Int. Cl.[7] .......................... F21V 5/04; G02B 11/00; G09F 13/16

(52) U.S. Cl. ....................... 362/335; 362/455; 359/642; 359/710; 40/582

(58) Field of Search ................................ 362/335, 333, 362/244, 237, 240, 336, 455, 326; 359/728, 742, 718, 642, 668, 710, 808, 811, 819, 625, 559, 254, 323; 350/189; 40/582, 583

(56) References Cited

U.S. PATENT DOCUMENTS 3,708,221 A * 1/1973 Schaefer ..................... 359/718
4,113,347 A 9/1978 Gaertner .................. 350/96.24

FOREIGN PATENT DOCUMENTS

| | | |
|---|---|---|
| DE | 40 40 567 C1 | 6/1992 |
| DE | 298 09 799 U1 | 9/1998 |
| GB | 2 022 303 A | 12/1979 |
| GB | 2 286 899 A | 8/1995 |
| JP | 03054592 | 3/1991 |

* cited by examiner

*Primary Examiner*—Sandra O'Shea
*Assistant Examiner*—Bao Truong
(74) *Attorney, Agent, or Firm*—Pauley Petersen Kinne & Erickson

(57) ABSTRACT

An illuminated indication device for road traffic. A number of indicating points are formed with indicating lenses in or on an indicating surface. The indicating lenses have a light entry surface and a light exit surface and are illuminated by the rear face of the indicating surface, which has individually allocated light-emitting elements with a small diameter. One object of this invention is to make the indication device easier to read. The light entry surface and/or the light exit surface is shaped in such a way that the distribution of light intensity on the indicator surface extends further in a horizontal direction than in a vertical direction.

12 Claims, 1 Drawing Sheet

FIG. 1
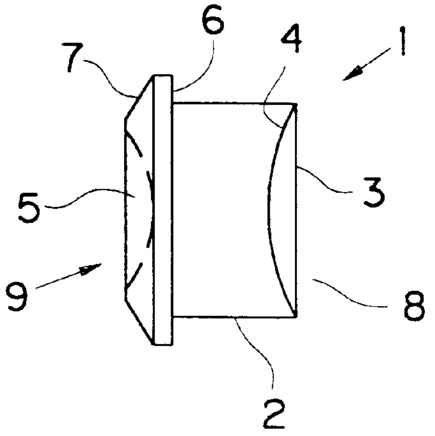
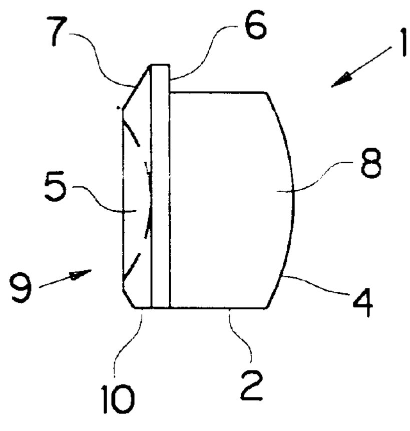
FIG. 2
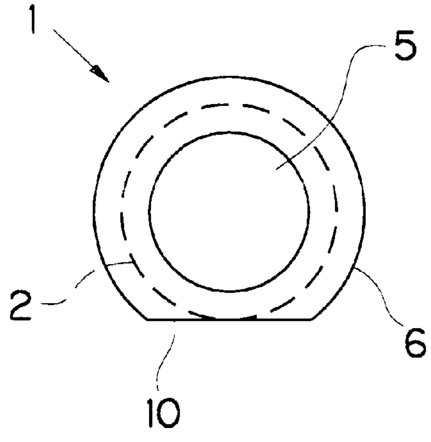
FIG. 3

ILLUMINATED INDICATION DEVICE FOR ROAD TRAFFIC

BACKGROUND OF THE INVENTION

1. Field of the Invention

This invention relates to an illuminated display device for road traffic, wherein a plurality of display points with display lenses, which have a light inlet surface and a light outlet surface and are illuminated from a direction of a back of the display surface by respectively associated illumination elements of lesser diameter, are formed in or on a display surface, and wherein a light inlet surface and/or a light outlet surface each is shaped so that the light intensity distribution on the display side has a greater extension in the horizontal direction than in the vertical direction.

2. Description of Related Art

An illuminated display device of this type is disclosed in U.S. Pat. No. 4,113,347. In this known illuminated display device a lateral increase of the angle of radiation, or respectively of the light intensity distribution is achieved with two lens elements embodied next to each other.

Japanese Patent Reference JP-A 03 054 592 discloses arranging the cylinder axes of two cylindrical lenses of different curvatures perpendicularly with respect to each other for achieving a greater extension of the light intensity distribution in one direction over the other.

A further illuminated display device is disclosed by German Patent Reference DE 40 40 467 C1. In this known illuminated display device a plurality of display points are formed on a display surface by respective display lenses, which are illuminated from a back of the display surface by illuminating elements in the form of optical fibers directed on the display lenses. Display points with relatively large surfaces, which improve the visibility of a displayed character, are achieved with the display lenses, whose diameter is greater than the diameter of the optical fibers. In order to achieve a sufficiently high illumination density, the light emission is bundled with the lenses, but it is possible for the illumination density to become too low for good visibility at greater angles outside of the radiating axis, in particular in case of lighter surroundings.

SUMMARY OF THE INVENTION

One object of this invention is to provide an illuminated display device of the type mentioned above, wherein an increased illumination density of the light points at increased observation angles is achieved, while the light output of the illuminating elements remains unchanged, wherein the embodiment is also advantageous for maintenance purposes.

This object is achieved with a light outlet surface and/or a light inlet surface formed so that the light intensity distribution on the display side is greater in the horizontal direction than in the vertical direction. An increased light intensity or illumination density of the display points under increased horizontal observation angles results from this design of the display lenses, so that the visibility of the display is assured, even when approached from a curve in the road, for example. Although the distribution of the light intensity in the vertical direction is reduced to a correspondingly lesser angle with respect to the radiating axis at the expense of the light intensity distribution in the horizontal direction, it is sufficient for achieving requirements for good readability from the customary observation distances. The light from the display as a whole is considerably improved for actual observation conditions in road traffic.

The further measures are also particularly advantageous for maintenance because the display lens has a cylindrical section adjoining the light inlet surface, and on its radially symmetrical light inlet surface tapers toward an exterior in the form of a section of a cone, and has a central concave section. It is sufficient if the display lens is designed radially symmetrical at least in the light inlet area.

A suitable embodiment of the illuminated display device for good visibility consists in that the half-width value of the light intensity distribution in the horizontal direction is greater by at least a factor of 1.4 than the half-width value in the vertical direction. For example, the half-width value in the horizontal direction can be twice as great as in the vertical direction, whereas within the half-width value the light intensities with the same light sources is just as great as within the half-width value of light intensity distributions of customary radially symmetrical light intensity distributions. If up to now the half-width value of a radially symmetrical light intensity distribution was 12°, for example, this light intensity distribution is achieved with the present display device within a vertical half-width value of 6°, for example, and a horizontal half-width value of 24°, so that doubling of the corresponding extra-axial recognition angle results in the important horizontal range.

One embodiment of the display lenses has a radius of curvature of the light outlet surface which is less in the horizontal direction than in the vertical direction, wherein in another embodiment the light outlet surface is curved convexly toward the outside in the vertical direction and has a curvature radius of zero in the horizontal direction.

For production and mounting, the display lenses is designed so that the light outlet surface is formed in the shape of a section of a cylinder. Because of the cylindrical shape it is possible, for example, to produce the lenses from a glass rod made of an acrylic material and to insert a cylindrical piece into a corresponding bore in the display surface and fix it in place there.

A defined positioning and contact, as well as a tight securing possibility against the display surface, is achieved because the display lens has a flange-like collar on the circumference which rests on the outside of the display surface.

One step is advantageous for simple positioning of the display lenses in the circumferential direction, wherein a marker for the installed position is formed on the collar, In this case, a simple positioning aid includes the marker designed as a section of a circle.

With the above embodiments it is also possible to exchange the inlet surface with the outlet surface by rotating the lens by 180°.

BRIEF DESCRIPTION OF THE DRAWINGS

This invention will be explained in greater detail in view of an embodiment and by referring to the drawings, wherein:

FIG. 1 is a top view of a display lens, according to one preferred embodiment of this invention;

FIG. 2 is a side view of the display lens shown in FIG. 1; and

FIG. 3 is a front view of the display lens shown in FIG. 1.

DESCRIPTION OF PREFERRED EMBODIMENTS

A display lens 1 is shown in the drawings at FIG. 1 in a plan view, a display lens from the side at FIG. 2, and at FIG. 3 from the direction of a light inlet surface 9.

In a direction of the optical axis, the display lens 1 has a cylindrical section 2, which is adjoined at the one side by the light inlet surface 9 facing a display surface, and on the other side by a light outlet surface 8, illuminated by an associated illuminating element, for example an optical fiber or a light-emitting diode, which is illuminated on its side facing away from the display surface 1.

The light outlet surface 8 is formed in a cylinder shape, wherein it extends convexly curved toward the outside in the vertical direction, such as shown by reference numeral 4, and straight in the horizontal direction, such as shown by reference numeral 3.

The light inlet surface 9 comprises a slope 7 in the shape of a section of a cone on the circumference, which is cut off in the shape of a section of a circle on its side which is downwardly oriented in the installed position, as shown in FIG. 3 in particular. Moreover, a section 5 in the shape of a section of a sphere is formed in a central area of the light inlet surface 9. In the direction toward the light outlet surface 8, the light inlet surface 9 has a shoulder-like collar 6 on the outer circumference of the cylindrical section 2, by which the display lens rests in a flange-like manner against the display surface in the assembled state, so that a defined installed position in the axial direction is achieved. In the circumferential direction, a defined installed position is formed by a marker, such as a cut-off portion 10, on an underside of the rim of the light inlet surface 9, which extends in the axial direction over the collar 6 and which, in an axial plan view as shown in FIG. 3, tangentially adjoins the cylindrical section 2, so that the entry of the light or the exit of the light is not thus hampered.

The display lens 1 embodied in the described manner results in a widening of the light intensity distribution curve in the horizontal direction and a narrowing of the light intensity distribution curve in the vertical direction, wherein the half-width value can be 6° in the vertical direction and 24° in the horizontal direction, for example. In this case the light intensity within the half-width value is as great as with a radially symmetrical light intensity distribution with a half-width value of 12°, if the radiation into the display lens 1 is the same. The described embodiment of the lens 1 is also advantageous for its mounting and production.

What is claimed is:

1. In an illuminated display device for road traffic, the display device comprising a plurality of display points defined by a plurality of display lenses (1), each of the display lenses have a light inlet surface (9) and a light outlet surface (8) and are illuminated from a direction of a back of a display surface by respectively associated illumination elements of lesser diameter, the display lenses are formed one of in and on the display surface, and wherein a light intensity distribution on a display side of the display device is greater in a horizontal direction than in a vertical direction, the improvement comprising:

each of the display lenses (1) having a cylindrical section (2) adjoining the light outlet surface (8) and the light inlet surface (9) of each of the display lenses (1) having a central concave section (5) surrounded by a slope surface (7) in a shape of a section of a cone which tapers toward an exterior of the display lens (1).

2. In the illuminated display device in accordance with claim 1, wherein a first half-width value of a light intensity distribution in the horizontal direction is greater by at least a factor of 1.4 than a second half-width value in the vertical direction.

3. In the illuminated display device in accordance with claim 2, wherein a radius of curvature of the light outlet surface (8) is less in the horizontal direction than in the vertical direction.

4. In the illuminated display device in accordance with claim 3, wherein the light outlet surface (8) is curved convexly toward an outside in the vertical direction and has a second radius of curvature of zero in the horizontal direction.

5. In the illuminated display device in accordance with claim 4, wherein the light outlet surface (8) is shaped as a section of a cylinder.

6. In the illuminated display device in accordance with claim 5, wherein the display lens (1) has a flange collar (6) on a circumference that abuts the display surface.

7. In the illuminated display device in accordance with claim 6, wherein a marker (10) identifying an installed position is formed on the flange collar (6).

8. In the illuminated display device in accordance with claim 7, wherein the marker (10) is shaped as a section of a circle.

9. In the illuminated display device in accordance with claim 1, wherein a radius of curvature of the light outlet surface (8) is less in the horizontal direction than in the vertical direction.

10. In the illuminated display device in accordance with claim 7, wherein the light outlet surface (8) is curved convexly toward an outside in the vertical direction and has a second radius of curvature of zero in the horizontal direction.

11. In the illuminated display device in accordance with claim 3, wherein the light outlet surface (8) is shaped as a section of a cylinder.

12. In the illuminated display device in accordance with claim 1, wherein the display lens (1) has a flange collar (6) on a circumference that abuts the display surface.

* * * * *